United States Patent

Ehrenfried et al.

[15] 3,653,262

[45] Apr. 4, 1972

[54] TEMPERATURE AND LEVEL SENSOR

[72] Inventors: Albert D. Ehrenfried, Concord; John Niejadlik, Littleton; Norton T. Pierce, Concord, all of Mass.

[73] Assignee: Metritake, Inc., West Concord, Mass.

[22] Filed: Oct. 22, 1970

[21] Appl. No.: 82,875

[52] U.S. Cl. ............................73/292, 73/301, 73/342, 73/344
[51] Int. Cl. ..................G01f 23/24, G01k 7/16, G01k 13/02
[58] Field of Search..................73/292, 295, 301, 342, 344

[56] References Cited

UNITED STATES PATENTS 3,153,342   10/1964   Pierce et al. ...........................73/301
3,477,290   11/1969   Lerner....................................73/301
3,511,090   5/1970    Ehrenfried et al. ....................73/292
3,583,221   6/1971    Ehrenfried et al. ....................73/301

Primary Examiner—Louis R. Prince
Assistant Examiner—Frederick Shoon
Attorney—Weingarten, Maxham and Schurgin

[57] ABSTRACT

An elongated sensor adapted to be suspended within a fluent material and operative to measure the level of the material and the temperature at one or more positions within the material bulk.

9 Claims, 7 Drawing Figures

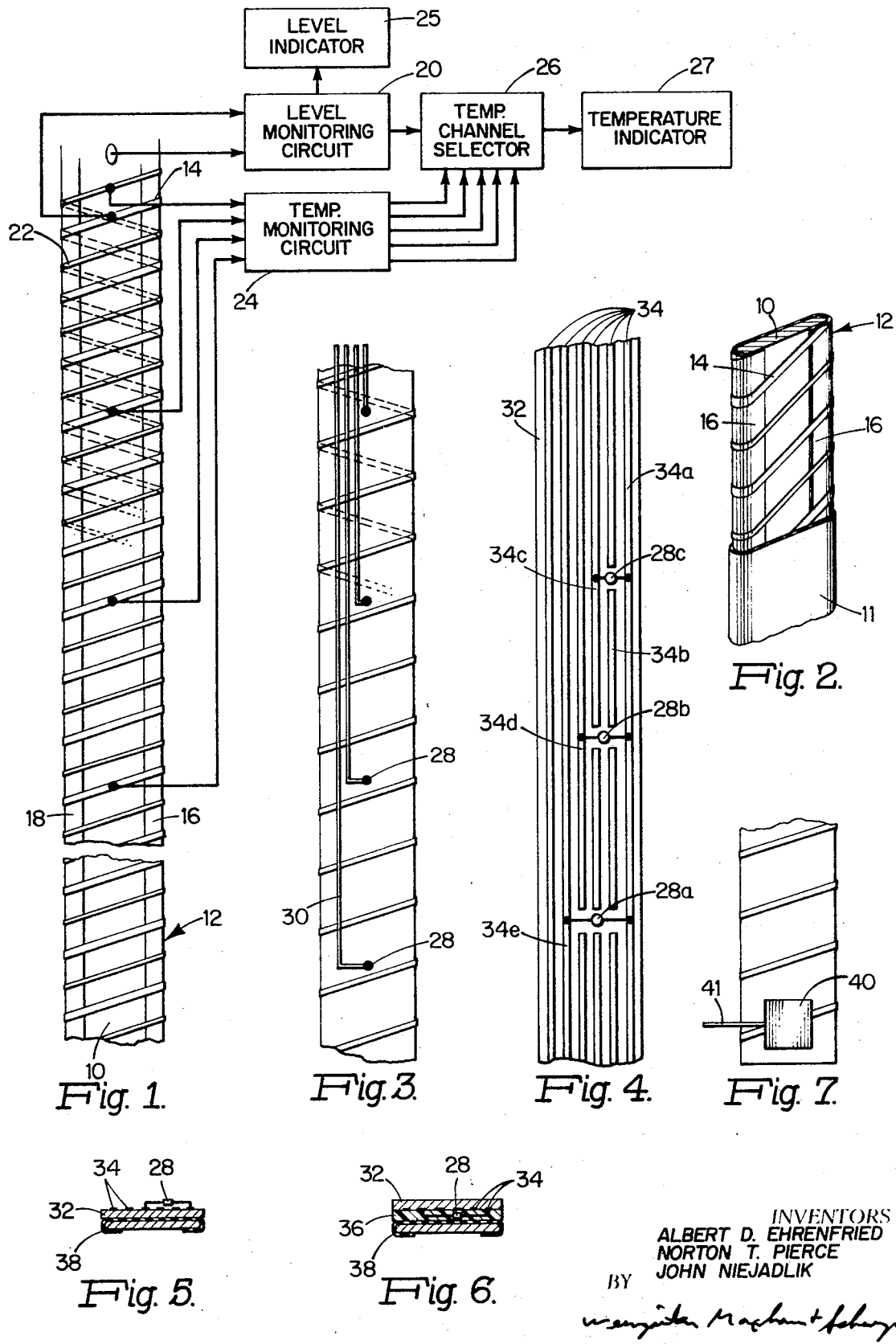

TEMPERATURE AND LEVEL SENSOR

BACKGROUND OF THE INVENTION

It is often desirable to monitor the temperature within a fluent bulk material such as a liquid or a solid particulate material. For example, in the custody transfer of bulk commodities, an accurate temperature measurement is required which must be related to a standard trading conditions. Temperature measurement is also required for the controlled processing of materials, and for the detection of spontaneous heat generation within moist and fermenting products such as corn and grain. Temperature monitoring has heretofore been generally accomplished by use of discrete sensing elements, usually in the form of probes projecting through the wall of a storage vessel at selected elevations therein. Such probe-type sensors are rigidly cantilevered from the vessel wall and are subject to breakage especially in dry bulk materials. The vessel wall must be broken for sensor installation, and the sensors mounted thereon are in a position not easily accessible for installation and maintenance. Moreover, such wall mounted sensors provide temperature sensing only at a position near the wall, and sensor disposition may interfere with material flow. As a further disadvantage, it is rather costly and relatively complex to electrically interconnect each sensor to remote monitoring circuitry.

SUMMARY OF THE INVENTION

In accordance with the present invention, an elongated sensor is provided which can be freely suspended within a mass of fluent material and which is operative to provide a measure of temperature within the material mass in conjunction with a measure of material level. The sensor is of a construction that can withstand the forces which may be encountered within a bulk material storage vessel, and physical mounting and electrical connection is conveniently made at the top of the storage vessel.

One construction of the novel sensor includes an elongated conductive base strip having a first winding helically wound therearound and a second winding helically wound in bifilar manner around the base strip. The first winding is composed of a resistance wire insulated from the base strip except for an exposed portion along one face thereof, with the portions of the winding bridging the exposed portion of the base strip being in spaced relation thereto. The second winding is insulated from the elongated base strip along its full length and is composed of a resistance temperature dependent wire. One end of each of the windings is electrically connected to the conductive base strip which serves as a common sensor terminal while the opposite ends thereof also serve as device terminals.

The first winding is operative to detect the level of fluent material surrounding the sensor, while the second winding provides an indication of temperature as sensed along the entire sensor length. The sensor provides an indication of the average temperature sensed along the length of temperature-sensing helix, and individual zones can be provided along the sensor for determining temperature within selected zones which may be associated with the level measurement as also determined by the novel sensor.

In operation, the sensor is usually vertically suspended within a storage vessel from a mounting on the roof thereof, and is freely suspended within the surrounding material within the vessel. The sensor is sufficiently resilient to accommodate forces experienced during draining and filling operations. Electrical connection is made outside of the storage vessel at the upper end of the sensor and no wiring external to the sensor is required along the sensor length.

DESCRIPTION OF THE DRAWING

The invention will be more fully understood from the following detailed description taken in conjunction with the accompanying drawings, in which:

FIG. 1 is an elevation view of a sensor according to the invention with a block diagram of associated circuitry;

FIG. 2 is a cutaway pictorial view of a sensor according to the invention;

FIG. 3 is an elevation view of an alternative sensor construction according to the invention;

FIG. 4 is an elevation view of a further embodiment of the invention;

FIG. 5 is an end view of the embodiment of FIG. 4;

FIG. 6 is an end view of an alternative implementation of the embodiment of FIG. 4; and FIG. 7 is an elevation view of an additional embodiment of the invention.

DETAILED DESCRIPTION OF THE INVENTION

Referring to FIGS. 1 and 2 there is shown a novel level and temperature sensor which includes an elongated conductive base strip 10 having a partially surrounding insulative layer 12 formed therearound and defining an exposed portion along the front surface thereof. A resistance wire 14 is helically wound around base strip 10 and insulation 12 and is in spaced relation to the confronting surface of base strip 10 by operation of the shoulder portions 16 and 18 of insulative layer 12. A resilient jacket 11 is formed around the sensor to isolate the sensor from the working environment. One end of winding 14 is coupled to a level monitoring circuit 20 while the conductive base strip 10 is also coupled to circuit 20. An insulated resistance temperature dependent wire 22 is wound in a bifilar manner with winding 14 around base strip 10 and insulation 12 along the entire length thereof to provide a continuous elongated temperature sensing element. Winding 22 is coupled at selected points to a temperature monitoring circuit 24. Both the level monitoring circuit 20 and temperature monitoring circuit 24 are coupled to a temperature channel selector 26 operative to energize an output indicator 27 which denotes zoned or average temperature as sensed by the novel detector.

The invention makes use of a highly effective and commercially attractive level detector described in U.S. Pat. No. 3,153,342, assigned to the assignee of the present invention, and additionally provides a practical means for determining temperature substantially throughout the length of a bulk storage vessel by means of a unitary sensor structure which is compatible with the environment within such storage vessels and which does not require any ancillary wiring therein.

By virtue of the elongated tape-like construction of the novel sensor, temperature and level sensing are readily accomplished throughout any practical length dictated by particular installation requirements. A continuous measure of material level within a storage vessel as well as a continuous measure of temperature therein is provided by the invention, and the level and temperature determinations can be variously utilized to provide indications of average, zoned or discrete temperature.

In operation, the elongated sensor is disposed within a fluent material, the level of which is to be determined, in conjunction with the average or zoned temperature within the material bulk. The sensor typically is vertically suspended within a storage vessel by a suitable mounting collar disposed at the upper end of the sensor. Such a mounting system is shown for example in copending patent application Ser. No. 813,943 filed Apr. 7, 1969, now U.S. Pat. No. 3,583,221, and also assigned to the assignee of the present invention. The portion of the sensor within the fluent material experiences a force of the surrounding material which causes the turns in this submerged portion to deflect into contact with the underlying base strip 10 to thereby provide a resistance measurement which is representative of material level. Level monitoring circuit 20 is operative to sense the variable resistance in accordance with material height and to energize a level indicator 25 which provides an output indication of material level.

The resistance winding 22 provides one or more output resistance measurements representative of the temperature sensed at respective points along the sensor length. Temperature monitoring circuit 24 is operative to determine the temperature measurements at the several zones defined by winding 22. Temperature channel selector 26 is operative to provide a temperature indication of a selected zone which can be manually selected or selected in accordance with the material level as determined by the level sensing winding of the same sensor. The temperatures as determined by the several sensing points along the sensor length can be averaged to provide an indication of average temperature along the entire sensor length, or the temperature in one or more selected zones can individually be determined.

The circuitry 20, 24 and 26 for providing an indication of level and temperature measurement can be implemented in any manner well known to those versed in the design of electronic circuits, and need not be described in detail herein. Functionally, level monitoring circuit 20 provides a signal in response to and representative of the variable resistance provided by winding 14, and this signal can energize a suitable meter or indicator 21 calibrated to gauge material level. Similarly, temperature monitoring circuit 24 provides one or more signals in response to the resistance sensed by the winding 22 and representative of the temperature sensed by the one or more zones of winding 22. The temperature measurements are applied to the channel selector 26 which is operative to average the input signals from circuit 24 to provide a measure of averaged temperature along the entire sensor, and which is also operative to select one or more signals from the zones of winding 22 for zoned temperature measurement. A signal from level monitoring circuit 20 is also applied to channel selector 26 in order to permit correlation between temperature and level measure. For example, by use of a signal representing material level, zones of winding 22 within the material as well as above the material can be selected to provide a separate measure of temperature within the material bulk and thereabove.

As an alternative implementation, temperature sensing can be accomplished by one or more discrete elements disposed within the sensor jacket along the length thereof. Such discrete elements can be resistance temperature dependent sensors, thermistors or thermocouples. Referring to FIG. 3, there is shown the rear face of an elongated level sensor such as described in the aforesaid U.S. Pat. No. 3,153,342. Disposed at selected spaced intervals along the length of the sensor are a plurality of thermistors or thermocouples 28, or other discrete temperature sensing elements. The elements 28 are affixed to the level sensor, for example by a suitable adhesive, and typically are disposed therein within the outer jacket 11 (FIG. 2) of the sensor. Each element 28 includes terminal wires 30 which extend along the sensor length to the terminal end thereof for connection to temperature monitoring circuit 24. The leads 30 are usually run along the length of the sensor within the outer sensor jacket. The discrete temperature sensing element can also be a resistance temperature dependent resistive element, shown in FIG. 7, which is of planar configuration and which is itself known in the art. Such an element 40 can be mounted along the length of the level sensor at a selected position, with the terminal leads 41 thereof connected as described, to utilization apparatus.

Alternatively, the thermal sensing elements 28 can be embodied within a flexible elongated wiring strip, illustrated in FIG. 4, to provide a planar wiring configuration which is particularly compatible with the elongated sensor configuration. Referring to FIG. 4, there is shown an insulative strip 32 which has a width equal to or slightly less than the width of the base strip of an associated sensor, and which includes a plurality of conductive paths 34 arranged thereon in a parallel array and formed, for example, by well known etched or printed circuit techniques. The number of conductive paths will, of course, depend upon the number of temperature sensing elements to be accommodated in a particular embodiment.

Each element 28 is coupled between a common conductive path 34a and a selected second conductive path. For example, element 28a is coupled between conductive paths 34a and 34e. Element 28b is coupled between conductive paths 34a and 34b, while element 28c is coupled between paths 34a and 34c. The unused conductive paths adjacent a particular sensing element can be broken as illustrated to provide an area for accommodation of each element 28. Alternatively, the thermal sensing element can simply be disposed in insulated relation to the conductive paths 34 which need not necessarily be broken. The thermal sensor assembly, which includes the discrete elements 28 and associated printed wiring strip 32, is disposed on the side of the level sensor opposite to the active surface thereof and can be integrally jacketed therewith by a suitable flexible to protect it from the environment.

As shown in FIG. 5, the elements 28 mounted on its wiring strip 32 and connected between respective conductive paths 34 extends above the surface of circuit strip 32. In some environments, the elements may be subject to damage by reason of forces experienced within a material bulk. An alternative construction is depicted in FIG. 6 wherein the discrete elements 28 are disposed within the sensor structure in a position substantially immune from forces experienced during operation. Referring to FIG. 6, there is shown, in end view, a circuit strip 32 having conductive paths 34 formed on a surface thereof and confronting an intermediate layer 36 of insulative foam material disposed between strip 32 and the back surface of level sensor 38. Each element 28 is disposed within layer 36 in an opening or depression provided therein and is connected to respective conductive paths 34 as described hereinabove. A flexible jacket such as jacket 11 of FIG. 2, can be provided around this entire structure to protect the inner electrical system from the working environment, while the elements 28 are further protected by their disposition within the interior of the sensor structure.

Various modifications and alternative implementations will occur to those versed in the art without departing from the spirit and true scope of the invention. For example, the elongated base strip can be of resistive material with a helically wound conductive wire employed to selectively contact the underlying resistive base strip for providing a variable resistance indication of material level. In addition, the level sensing winding can also include multiple taps along the length thereof to provide zoned level switching as described in copending application Ser. No. 22,204, filed on Mar. 24, 1970. Accordingly, it is not intended to limit the invention by what has been particularly shown and described, except as indicated in the appended claims.

What is claimed is:

1. A temperature and level sensor comprising:
   an electrically conductive base strip;
   an insulative material partially surrounding said base strip to define an uninsulated opening along the length of one side of said base strip;
   a level sensing winding including
      a wire helically wound around the insulated base strip, the portions of the wire bridging the uninsulated opening being adapted to contact respective exposed confronting portions of the base strip in the presence of surrounding pressure;
   a flexible jacket surrounding said insulated base strip and said helical wire, and being sensitive to surrounding pressure;
   temperature sensing means disposed within said jacket in predetermined disposition along the length of said base strip;
   at least one of said base strip and said helical wire being resistive;
   said base strip and said helical wire being adapted for connection to level monitoring circuitry; and
   said temperature sensing means being adapted for connection to temperature monitoring circuitry.

2. A temperature and level sensor according to a claim 1 wherein said temperature sensing means includes an insulative resistance temperature dependent wire helically wound together with said level sensing winding in bifilar manner around said insulated base strip substantially along the full length thereof.

3. A temperature and level sensor according to claim 2 wherein said resistance temperature dependent wire includes a plurality of electrical connections each disposed at a respective position along the length thereof;
- a temperature monitoring circuit coupled to said plurality of connections; and
- a level monitoring circuit coupled to said base strip and said helical wire; and
- a selector circuit coupled to said level monitoring circuit and said temperature monitoring circuit and operative to provide an output indication of temperature in one or more zones along the length of said sensor defined by said plurality of connections.

4. A temperature and level sensor according to claim 1 wherein said temperature sensing means includes a plurality of discrete temperature sensing elements each disposed at a respective position along the length of said base strip.

5. A temperature and level sensor according to claim 1 including an elongated insulative strip substantially co-extensive with said conductive base strip and disposed in association therewith; and
- a plurality of conductive paths formed on a surface of said insulative strip;
- and wherein said temperature sensing means includes a plurality of temperature sensing elements, each disposed on said insulative strip and each connected between a respective pair of said conductive paths.

6. A temperature and level sensor according to claim 5 wherein said insulative strip is attached to said conductive base strip on a side opposite said uninsulated opening.

7. A temperature and level sensor according to claim 5 including a resilient spacer member mounted on a substantially coextensive with the surface of said base strip opposite said uninsulated opening;
- and wherein said insulated strip is attached to said resilient spacer member with said conductive paths in confronting relation therewith and said temperature sensing elements disposed within said spacer member.

8. A temperature and level sensor according to claim 1 including:
- first circuit means connected to said base strip and said helical wire and operative to provide an output indication of material level; and
- second circuit means connected to said temperature sensing means for providing an output indication of temperature along a predetermined portion of said sensor.

9. A temperature and level sensor according to claim 1 including:
- a temperature monitoring circuit;
- a level monitoring circuit;
- means connecting said base strip and said helical wire to said level monitoring circuit; and
- means connecting said temperature sensing means to said temperature monitoring circuit.

* * * * *

UNITED STATES PATENT OFFICE
CERTIFICATE OF CORRECTION

Patent No. 3,653,262  Dated April 4, 1972

Inventor(s) Albert D. Ehrenfried et al

It is certified that error appears in the above-identified patent and that said Letters Patent are hereby corrected as shown below:

Cover page, column 1, "Metritake" should read --Metritape--.

Signed and sealed this 27th day of February 1973.

(SEAL)
Attest:

EDWARD M. FLETCHER, JR.
Attesting Officer

ROBERT GOTTSCHALK
Commissioner of Patents